United States Patent [19]

Fink

[11] Patent Number: 5,452,313

[45] Date of Patent: Sep. 19, 1995

[54] OPTICAL FEEDBACK ELIMINATOR

[75] Inventor: David Fink, Los Angeles, Calif.

[73] Assignee: Hughes Aircraft Company, Los Angeles, Calif.

[21] Appl. No.: 210,481

[22] Filed: Mar. 21, 1994

[51] Int. Cl.⁶ .......................... H01S 3/23; H01S 3/10
[52] U.S. Cl. ................................ 372/13; 359/287; 359/337
[58] Field of Search .................. 372/13, 28, 19, 32, 372/9, 703; 359/287, 337

[56] References Cited

U.S. PATENT DOCUMENTS

| 3,820,037 | 6/1974 | Corcoran | 372/28 |
| 4,586,184 | 4/1986 | Hess | 372/28 |
| 4,700,150 | 10/1987 | Hall et al. | 372/32 |
| 4,736,382 | 3/1988 | O'Meara | 359/287 |
| 4,979,176 | 12/1990 | Young et al. | 372/13 |

FOREIGN PATENT DOCUMENTS 2181294  3/1987  United Kingdom ............... 359/287

Primary Examiner—Rodney B. Bovernick
Assistant Examiner—Robert McNutt
Attorney, Agent, or Firm—Hugh P. Gortler; Michael W. Sales; Wanda K. Denson-Low

[57] ABSTRACT

Deleterious feedback reflections from a power amplifier into a laser master oscillator are eliminated by interposing a nonreciprocal frequency shifter between the oscillator and amplifier, which shifts the laser frequency by more than twice the bandwidth of the laser oscillator resonant cavity.

15 Claims, 1 Drawing Sheet

OPTICAL FEEDBACK ELIMINATOR

BACKGROUND OF THE INVENTION

1. Field of the Invention

The subject invention relates to oscillators and more particularly to apparatus that eliminates the effect of feedback reflections on the output of a master oscillator, and, more particularly, a laser master oscillator.

2. Description of Related Art

A small amount of output power reflected back into an oscillator can have a large influence on the output of the oscillator. With respect to a laser master oscillator, the feedback is equivalent to coupling another resonant cavity to the existing oscillator, and the feedback will interfere with the circulating wave within the oscillator. This can have a devastating impact on the performance of a laser master oscillator/power amplifier (MOPA) system, as a small amount of power will be reflected back into the oscillator from the amplifier, and the resulting output fluctuations will be amplified. In a multi-section amplifier, the impedance change on moving from amplifier section to section gives rise to a reflection at each section, so that there are multiple feedback waves, each with its own phase relation to the original oscillator.

This effect is further exaggerated in a frequency chirped MOPA, as the phase relationships among the master oscillator and the reflected waves are constantly changing. The output power therefore becomes an erratic function of the frequency of the oscillator. As the rate of frequency chirp and the chirp repetition rate increase, the oscillator power fluctuations interact with the resonant cavity decay time and with the time constants of the gain medium. This interaction distorts the fluctuations so that they are no longer even determined by the instantaneous oscillator frequency and the phase shifts of the feedback reflections but also by the time history of the oscillator output.

Prior art techniques to isolate an oscillator from back reflections in an amplifier are (1) an extreme effort to eliminate reflections, (2) polarization isolation with Faraday rotators, and (3) polarization isolation with waveplates. These techniques have a number of disadvantages.

(1) While spurious reflections should be minimized, the complexity and expense can be prohibitive, and even then may be unsuccessful.

(2) Faraday rotation is the property some materials have of rotating the plane of polarization of a transmitted beam when the material is subjected to a magnetic field. The return trip through the rotator does not unrotate the effect, but doubles the rotation. By using a 45° rotator, the feedback beam polarization is rotated 90° from the original beam and can be blocked with a polarizer. Faraday isolators are often used for wavelengths shorter than 1 $\mu$m, but there are no good Faraday rotator materials in the longer infrared, such as the $CO_2$ laser wavelength of 10.6 $\mu$m. As an example of the difficulties, the $CO_2$ MOPA at the Lincoln Laboratory Firepond facility requires a 70 kgauss superconducting magnet for its Faraday rotator.

(3) Waveplate isolation works by using a quarter-waveplate to convert linearly-polarized light into a circularly-polarized waveform. Reflections are then circularly polarized in the opposite sense, and the waveplate converts them to linearly-polarized light orthogonal to the original, which can then be rejected by a polarizer. However, circular polarization between the oscillator and the reflectors is impractical in many systems.

In a MOPA system, the amplifier may have, for example, eight total-internal-reflection folds, each of which introduces a large phase shift between the horizontal and vertical components. These phase shifts will convert circular polarization to various elliptical polarization states, which then will not be converted back to orthogonal linear polarization at the waveplate. Also, the amplifier has a different transmission for horizontal and vertical polarization which affects its net gain for circular polarization as well as turning circular polarization into elliptical.

Neither Faraday rotation nor waveplate isolation can protect against scattered light, as it is not specially polarized.

SUMMARY OF THE INVENTION

It is therefore an object of the invention to eliminate the effect of feedback reflections on a master oscillator;

It is another object of the invention to eliminate the effect of feedback reflections from a power amplifier on a laser master oscillator;

It is another object of the invention to provide a feedback elimination apparatus that is effective and easily implemented; and It is another object of the invention to provide feedback elimination apparatus that is effective and easily implemented in a chirped MOPA system.

According to the invention, a frequency shifter is placed between the oscillator and the amplifier. The output from the oscillator is frequency shifted on its propagation to the amplifier, and any feedback is shifted again on its propagation back to the oscillator.

Further according to the invention, a nonreciprocal frequency shifter is employed. In such a frequency shifter, propagation backwards through the frequency shifter does not undo the frequency shift, and the second shift does not cancel the first (usually the net shift is about twice the first). Thus, feedback arrives back at the oscillator shifted from the original oscillator frequency. By selecting the two-pass frequency shift to be larger than the resonant bandwidth of the oscillator cavity, the feedback wave will not be resonant in the oscillator cavity and will not affect the oscillator. Since this approach does not depend on the polarization of the unwanted reflections, it will also isolate the oscillator from scattered light.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide feedback elimination apparatus that is particularly effective and readily implemented in a laser master oscillator/power amplifier system.

Figure 1:
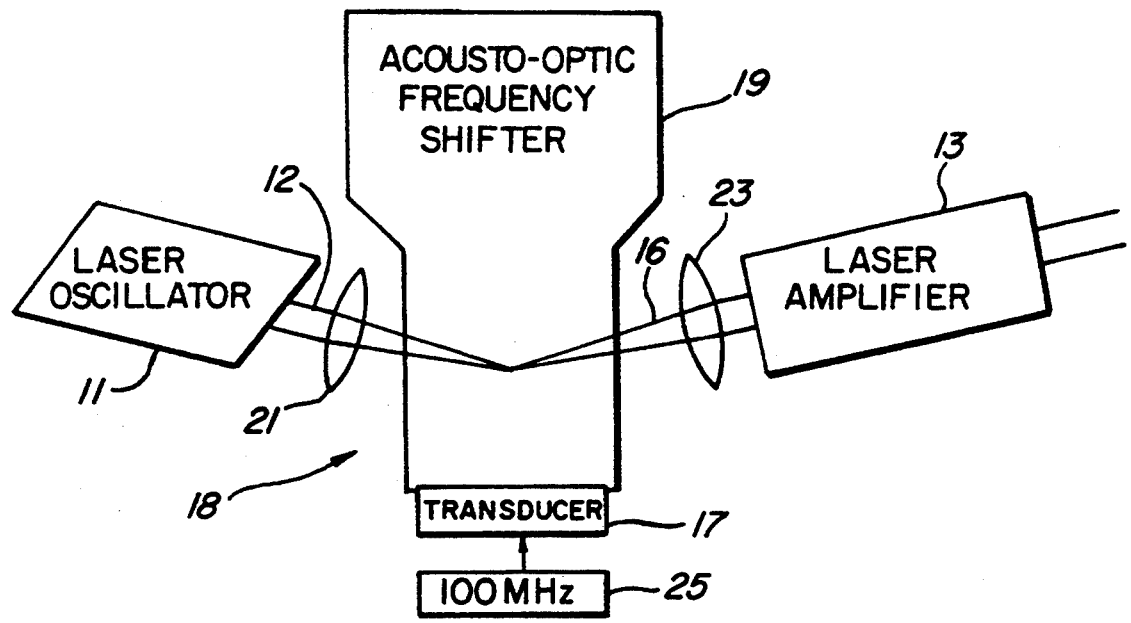
FIG. 1 is a schematic diagram of the preferred embodiment.

The preferred embodiment is illustrated in FIG. 1. It includes a laser 11 and a laser amplifier 13. The laser 11 may be, for example, a carbon dioxide ($CO_2$) infrared laser master oscillator. Both the laser 11 and laser amplifier 13 may be conventional units, as known to those skilled in the art.

Further according to the preferred embodiment, a frequency shifter 18 is interposed between the laser oscillator 11 and the laser amplifier 13. Any type of non-reciprocal frequency shifter (propagating backwards through the frequency shifter does not undo the frequency shift) can be used. Most frequency shifters are nonreciprocal.

FIG. 1 illustrates a frequency shifter 18 that works particularly well in the infrared: the acousto-optic frequency shifter 18. In this frequency shifter 18, a piezoelectric transducer 17 is used to generate acoustic waves in an acousto-optic crystal 19. The transducer 17 is driven at a frequency of, for example, 100 MHz by an electric voltage oscillator 25. The acoustic pressure wave in the crystal 19 causes periodic variations in the index of refraction, and light diffracts off these periodic index variations. Not only is the direction of the light changed, but since the pressure waves are moving at the velocity of sound in the crystal 19, the diffracted light is also doppler shifted.

In the preferred embodiment of FIG. 1, a first lens 21 is provided to focus the output laser beam 12 to a small volume to achieve a high optical intensity, which, in turn, results in high efficiency within the acousto-optic frequency shifter 18. A second lens 23 recollimates the divergent beam 16 output by the shifter 18.

The free spectral range of a resonant cavity such as that of the laser 11 is the frequency separation between successive resonant frequencies; that is, as the frequency is increased and the wavelength is correspondingly decreased, a resonance occurs every time an integral number of wavelengths fits in a roundtrip through the cavity. This occurs every time the frequency changes by $c/2L$, where c is the speed of light and L is the optical length of the cavity.

Figure 2:
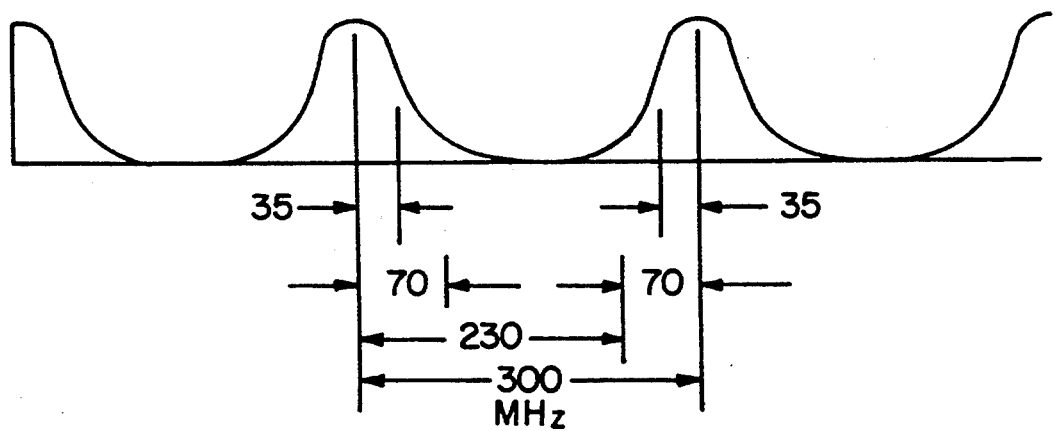
FIG. 2 is a schematic waveform diagram illustrating laser resonant cavity response of a typical $CO_2$ master oscillator laser.

The optical length of a $CO_2$ master oscillator cavity used for generating a frequency chirp is typically about 50 cm, so its free spectral range is about 300 MHz. Because of the modulators needed within the laser cavity to generate the frequency chirp, the loss per pass through the cavity is about 20%, including the loss from the output coupling. This fact leads to a cavity resonant bandwidth of about 35 MHz, half-width to half-height. It is desirable to frequency shift the spurious reflections by more than twice this bandwidth, but not so far as to approach the next free spectral range; that is it is desired to frequency shift the reflections between 70 MHz and 230 MHz, as shown in FIG. 2. Because the spurious reflections pass through the shifter 18 twice, the shifter 18 should supply something between 35 to 115 MHz.

To use this frequency shift between the laser oscillator 11 and amplifier 13, either the oscillator 11 or the amplifier 13 must be driven "off-line center," i.e., at a frequency different than the center frequency of their gain media. As known in the art, both the laser 11 and amplifier 13 have a range of frequencies over which they operate. A laser 11 typically outputs the greatest power at the center of this range, while a conventional amplifier 13 provides the highest gain at the center of its range.

In the choice of whether to drive the oscillator 11 or the amplifier 13 off-line center, it is generally preferred to drive the amplifier 13 off-line center because of the difficulties of controlling the frequency modulation (FM) to amplitude modulation (AM) interaction in the oscillator 11 if it is not symmetrically chirped about line center. Additionally, a conventional amplifier 13 operates at a higher gas pressure than laser 11 and has a quite broad gain bandwidth. Because of this broad bandwidth, typically on the order of several hundred MHz, a shift of 50 MHz can be chosen to eliminate the feedback problem while still obtaining satisfactory performance from the amplifier 13.

The required frequency shifts nicely match those of commercially available acousto-optic frequency shifters, which are usually designed to operate at a center frequency of 70 to 130 MHz and are tunable plus or minus 20 MHz. Diffraction efficiencies of 85% can be achieved with rf drive powers of 50 watts. Since the laser amplifier 13 may be driven with a kilowatt of power, an extra 50 watts for the isolator 18 is not a significant penalty.

While disclosed in the context of a laser master oscillator/power amplifier system, the concept of the invention is not restricted to a laser system, but may be applicable to other oscillator/amplifier systems. In addition, reflecting a laser back to its source to interfere with the oscillator is a known laser countermeasure technique. The subject feedback eliminator suggests itself for application as a counter-countermeasure to prevent such interference.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A laser system comprising:
   a laser master oscillator having a resonant cavity;
   a laser amplifier for amplifying an output of said laser master oscillator; and
   frequency shifter means for isolating said laser master oscillator from feedback from said laser amplifier by frequency shifting said output and said feedback such that said frequency-shifted feedback does not match any modes of the resonant cavity of the laser master oscillator.

2. The system of claim 1 wherein said frequency shifter means comprises a nonreciprocal frequency shifter.

3. The system of claim 2 wherein said frequency shifter means comprises an acousto-optic crystal.

4. The system of claim 2 wherein said frequency shifter means shifts said frequency by more than twice the bandwidth of the resonant cavity of said master oscillator.

5. The system of claim 2 wherein said frequency shifter means comprises an acousto-optic frequency shifter having an acousto-optic crystal and a transducer means driven by a driver oscillator.

6. The system of claim 5 further including first lens means for focusing said output waveform to achieve increased intensity within said acousto-optic crystal.

7. The system of claim 6 further including second lens means for recollimating the divergent output of said acousto-optic crystal.

8. The system of claim 1, wherein said laser master oscillator and said laser amplifier employ the same lasing medium, and wherein both said laser master oscillator and said laser amplifier are driven off-line center.

9. The system of claim 1 wherein said laser master oscillator further comprises a $CO_2$ laser and said cavity bandwidth is about 35 MHz.

10. The system of claim 9 wherein said frequency shifter means comprises an acousto-optic frequency shifter having an acousto-optic crystal and a transducer means driven by a driver oscillator.

11. The system of claim 10 wherein the frequency of said oscillator is between 35 and 100 MHz.

12. The system of claim 11 wherein said transducer is a piezoelectric crystal and said driver oscillator is an electric voltage oscillator.

13. The system of claim 10 further including first lens means for focusing said output waveform to achieve increased intensity within said acousto-optic crystal.

14. The system of claim 13 further including second lens means for recollimating the divergent output of said acousto-optic crystal.

15. A laser system comprising:
a laser master oscillator having a resonant cavity;
a laser amplifier for amplifying an output of said laser master oscillator; and
a non-reciprocal frequency shifter interposed between said oscillator and amplifier, said isolator frequency shifter shifting said output and reflections from said amplifier such that said frequency-shifted reflections are not the resonant cavity modes of the laser master oscillator.

* * * * *